US008876390B2

(12) United States Patent
McNeil

(10) Patent No.: US 8,876,390 B2
(45) Date of Patent: Nov. 4, 2014

(54) SLOTTED BEARINGS WITH WEAR-RESISTANT TREATMENTS FOR GEARBOX MOUNTING IN A GEARED TURBOFAN ENGINE

(71) Applicant: Roller Bearing Company of America, Inc., Oxford, CT (US)

(72) Inventor: Scott McNeil, Gilford, NH (US)

(73) Assignee: Roller Bearing Company of America, Inc., Oxford, CT (US)

( * ) Notice: Subject to any disclaimer, the term of this patent is extended or adjusted under 35 U.S.C. 154(b) by 47 days.

(21) Appl. No.: 13/715,315

(22) Filed: Dec. 14, 2012

(65) Prior Publication Data

US 2013/0160604 A1 Jun. 27, 2013

Related U.S. Application Data

(60) Provisional application No. 61/570,380, filed on Dec. 14, 2011.

(51) Int. Cl.
| | |
|---|---|
| *F16C 23/04* | (2006.01) |
| *F16C 33/12* | (2006.01) |
| *F16C 11/06* | (2006.01) |
| *F16C 17/12* | (2006.01) |
| *F16C 7/00* | (2006.01) |

(52) U.S. Cl.
CPC .............. *F16C 33/12* (2013.01); *F16C 11/0614* (2013.01); *F16C 17/12* (2013.01); *F16C 7/00* (2013.01); *F16C 23/045* (2013.01); *Y10S 384/912* (2013.01); *Y10S 384/913* (2013.01)
USPC .............................. 384/206; 384/912; 384/913

(58) Field of Classification Search
CPC ........ F16C 7/00; F16C 11/0614; F16C 17/12; F16C 23/043; F16C 23/045; F16C 33/12; F16C 33/121; F16C 33/125; F16C 2202/04; F16C 2204/52; F16C 2223/10

USPC .......................... 384/206–214, 907, 912, 913
See application file for complete search history.

(56) References Cited

U.S. PATENT DOCUMENTS 2,781,238 A * 2/1957 Carter ........................... 384/208
3,222,228 A 12/1965 Stanley et al.
(Continued)

FOREIGN PATENT DOCUMENTS

JP 61165021 A 7/1986

OTHER PUBLICATIONS

International Search Report issued in PCT Application No. PCT/US2012/069811 dated Mar. 19, 2013.
(Continued)

*Primary Examiner* — James Pilkington
(74) *Attorney, Agent, or Firm* — MKG, LLC

(57) ABSTRACT

A load slot bearing system for a mounting system for a gearbox on a geared turbofan engine includes a load slot bearing assembly having a cobalt alloy inner member and a precipitation-hardenable alloy outer member. The inner member defines an outer engagement surface and the outer member defines an inner engagement surface slidably and rotatably engaged with the inner engagement surface. One of the outer engagement surface or the inner engagement surface has boron diffused therein. The load slot bearing system includes first and second slots extending inward from a face defined by the outer member, the second slot being positioned generally diametrically opposite the first slot. A first element is located in the bore of the inner member of the load slot bearing assembly and is connected to the inner member. A second element is connected to the outer member of the load slot bearing assembly.

10 Claims, 10 Drawing Sheets

(56) References Cited

U.S. PATENT DOCUMENTS

| | | |
|---|---|---|
| 3,371,398 A | 3/1968 | Patterson et al. |
| 3,589,779 A | 6/1971 | Sokol |
| 3,940,836 A | 3/1976 | McCloskey |
| 3,947,075 A | 3/1976 | Ewertz |
| 3,998,504 A | 12/1976 | McCloskey |
| 4,055,369 A * | 10/1977 | Lynn et al. ............... 384/206 |
| 4,115,156 A | 9/1978 | Straumann |
| 4,386,869 A | 6/1983 | Smith |
| 4,411,545 A | 10/1983 | Roberge |
| 4,709,939 A * | 12/1987 | Stewart ................ 280/250.1 |
| 5,005,991 A | 4/1991 | Heumann et al. |
| 5,052,824 A * | 10/1991 | Van Wyk ................ 384/203 |
| 5,494,357 A | 2/1996 | Harris et al. |
| 5,524,987 A | 6/1996 | Vigeh |
| 5,851,313 A | 12/1998 | Milam |
| 6,146,021 A | 11/2000 | Ward |
| 6,209,206 B1 * | 4/2001 | Harris et al. ............... 384/208 |
| 6,517,249 B1 | 2/2003 | Doll |
| 6,575,631 B2 | 6/2003 | Shoda et al. |
| 6,988,830 B2 | 1/2006 | Maasch et al. |
| 2003/0095729 A1 | 5/2003 | Post et al. |
| 2005/0196083 A1 | 9/2005 | Maasch et al. |
| 2005/0207684 A1 | 9/2005 | Lu et al. |
| 2006/0062502 A1 | 3/2006 | Hupp |
| 2008/0040886 A1 | 2/2008 | Arnold et al. |
| 2009/0097787 A1 | 4/2009 | Richard et al. |
| 2010/0150489 A1 | 6/2010 | Maeda |
| 2010/0269629 A1 | 10/2010 | Nunn et al. |
| 2011/0038576 A1 | 2/2011 | Thornton et al. |
| 2011/0269556 A1 | 11/2011 | Kobayashi et al. |

OTHER PUBLICATIONS

Bucknell, Influence on Fuel and Lubricants on Turbine Engine Design and Performance Fuel and Lubricant Analysis, p. 158 (1 page), Jun. 1973. NTIS, www.dtic.mil/cgi-bin/GetTRDoc?AD=AD0769309.

Matuschka, Boronizing, pp. i, ii, 91-92 (4 pages), 1980, Heyden & Son Inc., Philadelphia, PA.

Metals Handbook 9th ed. v. 3 Properties and Selection Stainless Steels. Tool Materials and Special-Purpose Metals, pp. 209, 212-213 (3 pages), Oct. 1986, American Society for Metals, Metals Park, OH.

Rexnord, Specialty Bearings: Engine & Gearbox Bearings, (6 pages), Aug. 22, 2013, http://www.rexnord.com/SITES/PROCESS/AEROSPACE/BEARINGS/Pages/EngineGearbox.aspx.

RBC Bearings Inc., Plain Bearings, (115 pages), 2008, http://www.rbcbearings.com/literature/pdfs/RBC_Plain_Bearings_Web.pdf.

Bucknell, Richard L., Influence of Fuels and Lubricants on Turbine Engine Design and Performance, Fuel and Lubricant Analyses, Air Force Aero Propulsion Laboratory, NTIS, dated Jun. 1973.

Matuschka, Alfred, Graf von, Boronizing, Book, Jan. 1975, pp. 91-92, Munich, Wien: Hanser, 1980. Germany.

ASM Handbook Committee, Metals Handbook 9th Edition, vol. 3, pp. 209-213, American Society for Metals, Metals Park, OH, 1980.

Rexnord Informational Website, www.rexnord.com/sites/process/aerospace/bearings/pages/enginesgearbox.aspx.

RBC Plain Bearings Catalog, 2008, 2011 RBC-ACPB Rev. 12/11.

* cited by examiner

SLOTTED BEARINGS WITH WEAR-RESISTANT TREATMENTS FOR GEARBOX MOUNTING IN A GEARED TURBOFAN ENGINE

CROSS REFERENCE TO RELATED APPLICATION

This application claims the benefit of U.S. Provisional Patent Application No. 61/570,380, filed on Dec. 14, 2011, the contents of which are incorporated herein by reference in their entirety.

TECHNICAL FIELD

The present invention is generally directed to bearings and, more particularly, to slot loader bearings.

BACKGROUND

Spherical plain bearings typically comprise a ball positioned for rotational movement in an outer race. The outer race defines an inner surface contoured to receive and retain the ball therein. In one type of spherical plain bearing, the outer race is swaged around the spherical outer surface of the ball. In some cases, particularly those in which the ball and the outer race are each metallic, however, the outer race may be constructed with a slot to permit insertion of the ball. Such bearings are referred to as "load slot bearings."

The manufacture of load slot bearings generally involves heat treat case hardening processes to produce bearing elements having different hardnesses. Lapping of the outer race may also be employed to produce a bearing having the desired morphological surface characteristics for effective interaction between the outer race and the ball. Also, load slot bearings may include provisions for grease lubrication, solid film coatings, or metallic coatings to reduce the friction between the ball and the race. Load slot bearings are typically subject to maintenance at scheduled intervals. Non-compliance with the prescribed maintenance or with the schedule of maintenance can increase bearing wear and can compromise the life of the bearing. In particular, improper maintenance such as insufficient lubrication can have an impact on bearing operation and promote galling, fretting, and/or other types of wear.

SUMMARY

In one aspect, the present invention resides in a load slot bearing system for a mounting system for a gearbox on a geared turbofan engine wherein the load slot bearing system comprises a load slot bearing assembly. The load slot bearing assembly comprises an inner member comprising a cobalt alloy and the inner member has a spherical outer diameter and a bore extending at least partway therethrough such that the spherical outer diameter defines an outer engagement surface. The load slot bearing assembly further comprises an outer member comprising a precipitation-hardenable alloy and the outer member has a spherical inner diameter defining an inner engagement surface that is positioned on the outer engagement surface of the inner member and contoured to a shape complementary to the outer engagement surface of the inner member such that the outer engagement surface of the inner member is slidably and rotatably engaged with the inner engagement surface of the outer member. At least one of the outer engagement surface of the inner member or the inner engagement surface of the outer member has boron diffused therein. The load slot bearing system further comprises a first slot extending inward from a face defined by the outer member and a second slot extending inward from the face defined by the outer member, the second slot being positioned generally diametrically opposite the first slot. A first element is located in the bore of the inner member of the load slot bearing assembly and is connected to the inner member, and a second element is connected to the outer member of the load slot bearing assembly.

In another aspect, the present invention resides in a link apparatus for an actuating system for a turbofan engine component of a geared turbofan engine. The link apparatus comprises an elongated member defining a first end and a second end that includes a first housing located at the first end of the elongated member and a second housing located at the second end of the elongated member. A first load slot bearing assembly is located in the first housing and a second load slot bearing assembly is located in the second housing. The first and second load slot bearing assemblies each comprise a ball comprising a cobalt alloy and having a spherical outer diameter and a bore extending at least partway therethrough, the spherical outer diameter defining an outer engagement surface. The first and second load slot bearing assemblies each further comprise an outer race comprising a precipitation-hardenable alloy and having a spherical inner diameter defining an inner engagement surface case hardened by boron diffusion and positioned on the outer engagement surface of the ball and contoured to a shape complementary to the outer engagement surface of the ball such that the outer engagement surface of the ball is slidably and rotatably engaged with the inner engagement surface of the outer race. The first and second load slot bearing assemblies also define a first slot extending inward from a face defined by the outer race and a second slot extending inward from the face defined by the outer race, the second slot being positioned generally diametrically opposite the first slot.

DETAILED DESCRIPTION

Figure 1:
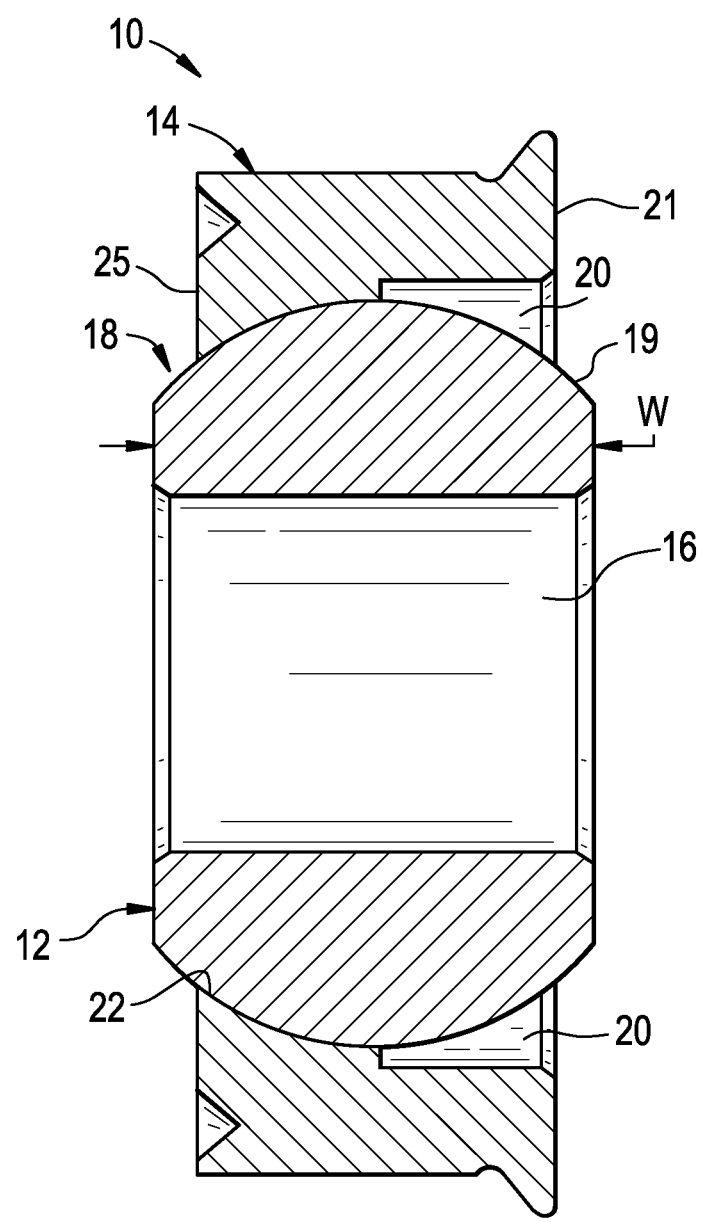
FIG. 1 is a side cross-sectional view of a load slot bearing assembly of a load slot system of the present invention.

A load slot bearing system for a mounting system for a gearbox on a geared turbofan engine of the present invention includes a load slot bearing assembly, shown in FIGS. 1 and 2, designated generally by the reference number 10 and hereinafter referred to as "bearing assembly 10." Bearing assembly 10 includes an inner member or a ball 12 positioned in an outer member or an outer race 14. The ball 12 defines a spherical outer diameter that in turn defines an outer engagement surface 18. The ball 12 further defines a bore 16 extending therethrough that is adapted to receive a portion of a shaft or other component therein. The present invention is not so limited, as the ball 12 may be integral with or form part of a shaft or other component. Moreover, while the bore 16 is shown and described as extending through the ball 12, the present invention is not limited in this regard as the bore can extend part-way through the ball, the bore may define a stepped-bore, or the ball may not define a bore, without departing from the broader aspects of the invention.

In the illustrated embodiment, the outer race 14 is a ring that defines a spherical inner diameter defining an inner surface, a first portion of which defines an inner engagement surface 22 of the outer race 14. The inner engagement surface 22 is positioned on the outer engagement surface 18 of the ball 12 and is contoured to a shape complementary to the outer engagement surface 18 such that the outer engagement surface 18 is slidably and rotatably engaged with the inner engagement surface 22 of the outer race 14. A second portion of the inner surface of the outer race 14 defines two load slots 20. In the illustrated embodiment, each load slot 20 is arcuate and extends inwardly from one end of the outer race 14. While the outer race 14 has been shown and described as being a ring, the present invention is not limited in this regard as the outer race can assume any practical shape or be part of another component, such as, for example a housing, without departing from the broader aspects of the invention. At least one of the outer engagement surface 18 of the ball 12 or the inner engagement surface 22 of the outer race 14 has boron diffused therein.

Figure 3:
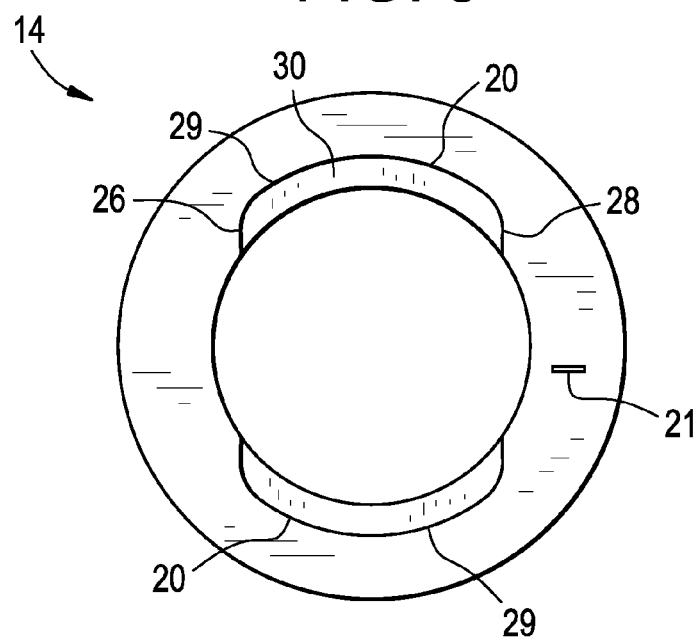
FIG. 3 is a front view of the outer race of the load slot bearing assembly of FIG. 2.

As shown in FIG. 3, each load slot 20 extends axially inwardly from an axial face 21 defined by the outer race 14. The transition from the face 21 to each load slot 20 is defined by an outermost edge 29. Each load slot 20 is defined by a first side wall 27, a second side wall 28, and an interior wall 30 connecting the first side wall 27 with the second side wall 28. The distance between the first side wall 27 and the second side wall 28 is greater than the width W of the ball 12 to allow the ball 12 to be inserted into the outer race 14 and rotated into an assembled position as shown in FIG. 1. As shown, the two load slots 20 are opposite each other such that one slot 20 is positioned generally diametrically opposite the other slot 20.

Figure 2:
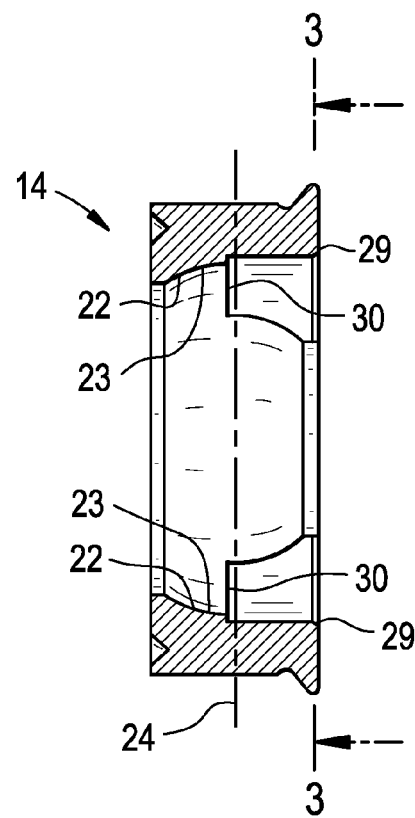
FIG. 2 is a side cross-sectional view of an outer race of the load slot bearing assembly of FIG. 1.

Referring to FIGS. 1-3, the ball 12 comprises a cobalt alloy having at least about 50% by weight cobalt. Exemplary cobalt alloys (cobalt 6 alloys) that could be used for the fabrication of the ball 12 include, but are not limited to, Stellite® 6 brand cobalt-chromium alloy (as well as other Stellite® brand materials) available from Deloro® Stellite® Group, Goshen, Ind., USA, L-605 (Haynes® brand Alloy 25, UNS R30605) available from HPA, Windfall, Ind., USA, and MP35N® brand alloy available from Carpenter Technology Corporation, Reading, Pa., USA. The ball 12 may be case hardened by boron diffusion, which allows boron to be diffused into the surface of the cobalt alloy.

A wear-resistant wear-fretting and gall resistant surface coating can be applied to the ball 12. Such a surface coating on the ball 12 can comprise an anti-galling compound, for example, molybdenum disulfide, tungsten disulfide, graphite, or other metallic or semi-metallic material to inhibit wear, galling, and/or fretting. In one embodiment, a single layer coating 19 of a dry lubricant is applied to the surface of the ball 12. Such a dry lubricant may be Everlube® 967 brand MoS2 based dry lubricant with a polymide binder or Everlube® 732 brand MoS2 based dry lubricant with an organic binder, both of which are molybdenum disulfide solid film lubricants in organic binders, available from Everlube Products, City, Ga., USA. The application of the single layer coating 19 of the dry lubricant the clearance between the outer engagement surface 18 of the ball 12 and the inner engagement surface 22 of the outer race 14 to be kept at a minimum (e.g., less than about 0.00254 mm (0.001 inches)) in order to keep the bearing assembly 10 tight.

Exemplary stainless steels for fabricating the outer race 14 include, but are not limited to, 17-4 PH® brand precipitation hardenable martensitic stainless steel, 15-5 PH® brand precipitation hardenable ferrite free stainless steel, A-286 stainless steel, and AM355 stainless steel, all of which exhibit desirable corrosion resistance and are environmentally friendly. For standard bearing applications, excluding high-temperature applications and critical linkage applications such as mounting a gearbox to a geared turbofan engine, the stainless steel outer race 14 (or a stainless steel ball 12) is hardened by a carburizing process. Carburizing is a metal hardening process that increases carbon on the surface of the stainless steel bearing component followed by heat treatment which absorbs carbon that is liberated when the bearing component is heated in the presence of a material comprising carbon, such as charcoal or carbon monoxide. However, it has been discovered that carburizing is not an appropriate hardening process for bearing components designed for high-temperature applications and critical linkage applications such as mounting a gearbox to a geared turbofan engine. The carburizing process depletes chromium from the stainless steel bearing component (i.e., the chromium of the stainless steel combines with carbide) such that the corrosion-resistance properties of the stainless steel are diminished.

Boron diffusion is a metal hardening process wherein boron is diffused into the surface of a metal component to substantially improve surface properties, wear-resistance and corrosion resistance. Boron reacts with the base material of the metal component to form a fully dense reaction zone of metal borides and thereby increase surface hardness to very high levels. One method for boron diffusion is the Borofuse Process™ brand boron diffusion process commercially available from Materials Development Corporation of Medford, Mass. USA. However, such a process, particularly for bearing components, limits the selection of base materials from which the bearing components may be fabricated, substantially increases the cost of the bearing components, and exposes the base material to comparatively high processing temperatures in the range of about 537.8° C. (1000° F.) up to about 1037.8° C. (1,900° F.). In addition, case hardening by boron diffusion requires that certain portions of the bearing component, for example portions of the outer race 14 and/or the ball 12, that are designed not to be case hardening by boron diffusion must be masked such as by copper plating prior to undergoing the case hardening process. Moreover, with respect to bearing components fabricated from a ferrous alloy, the diffusion of boron therein provides no improvement in the corrosion-resistance properties of the base material. The selection of a super alloy for a base material from which to fabricate the bearing assembly 10, or one of the outer race 14 or the ball 12, simply has been thought to be too complicated and too costly in comparison to maintaining or replacing convention bearing assemblies.

A case depth of the case hardening by boron diffusion can be approximately ten times narrower than the case depth of the case hardening by carburizing or nitriding. Typically, a case depth of the case hardening by carburizing or nitriding is in the range from about 0.00508 mm (0.002 inch) to about 0.0127 mm (0.005 inch). In comparison, the case depth of the case hardening by boron diffusion is in the range from about 0.00508 mm (0.0002 inch about 0.0127 mm (0.0005 inch).

In one embodiment of a bearing assembly 10 of the present invention, the outer race 14 is fabricated from a precipitation-hardenable alloy suitable for boron diffusion therein such as a nickel alloy (e.g., a high-temperature nickel alloy) or a super alloy. The inner engagement surface 22 of the outer race 14 is case hardened to provide wear resistance. The case hardening can comprise nitriding or, particularly in the case of high-temperature nickel alloys or super alloys, boron diffusion case hardening. The present invention is not limited to the use of case hardening, however, as other methods of providing wear resistance are within the scope of the present invention. In addition to case hardening, a wear-resistant plating 23 such as chromium, hard nickel, or the like can be applied, for example, by high velocity oxygen fuel (HVOF) thermal spray, to the inner engagement surface 22 of the outer race 14.

Exemplary super alloys or super-nickel alloys for fabricating the outer race 14 include but are not limited to Inconel® brand austenitic nickel-chromium-based super alloys (e.g., Inconel® 100, 600 713 and 718), Waspaloy® brand age hardening austenitic (face-centered cubic) nickel-based superalloy, Hastelloy® brand corrosion resistant alloy, René® brand nickel-based high temperature alloys (e.g., René® 41, 80, 95 and N5), and the like. Case hardening by boron diffusion allows boron to be diffused into the surface of the super alloy. In doing so, boron reacts with the various metals in the super alloy to form a dense reaction zone of intermetallic borides including, but not limited to, nickel borides, chromium borides, iron borides, and other borides of the metals in the nickel alloy. Such intermetallic borides exhibit desirable hardness at elevated temperatures thereby allowing the super alloys to be used in high-temperature applications in which, for example, the bearing assembly 10 is exposed to temperatures of about 315.6° C. (600° F.) and up to about 648.9° C. (1,200° F.).

Upon the ball 12 being received in the outer race 14, the bearing assembly 10 is particularly useful in applications such as geared turbofan engines and mounts for geared turbofan engine components and accessories and the like, for example, mounting gear boxes to turbofan engine cases or aircraft frames and, in particular, for supporting gear boxes on geared turbofan engines having multiple main shafts that operate at different speeds. Use of the bearing assembly 10 is particularly suited for use in turbofan engines which can operate optimally at temperatures up to about 315.6° C. (600° F.) and can further operate for a limited time at temperatures up to about 648.9° C. (1,200° F.). The present invention is not so limited, however, as the bearing assembly 10 may be used in connection with any other device such a control rod, steering link, tie rod, actuator, or the like that can be employed in aircraft, aerospace, heavy equipment, or vehicular applications.

Figure 4:
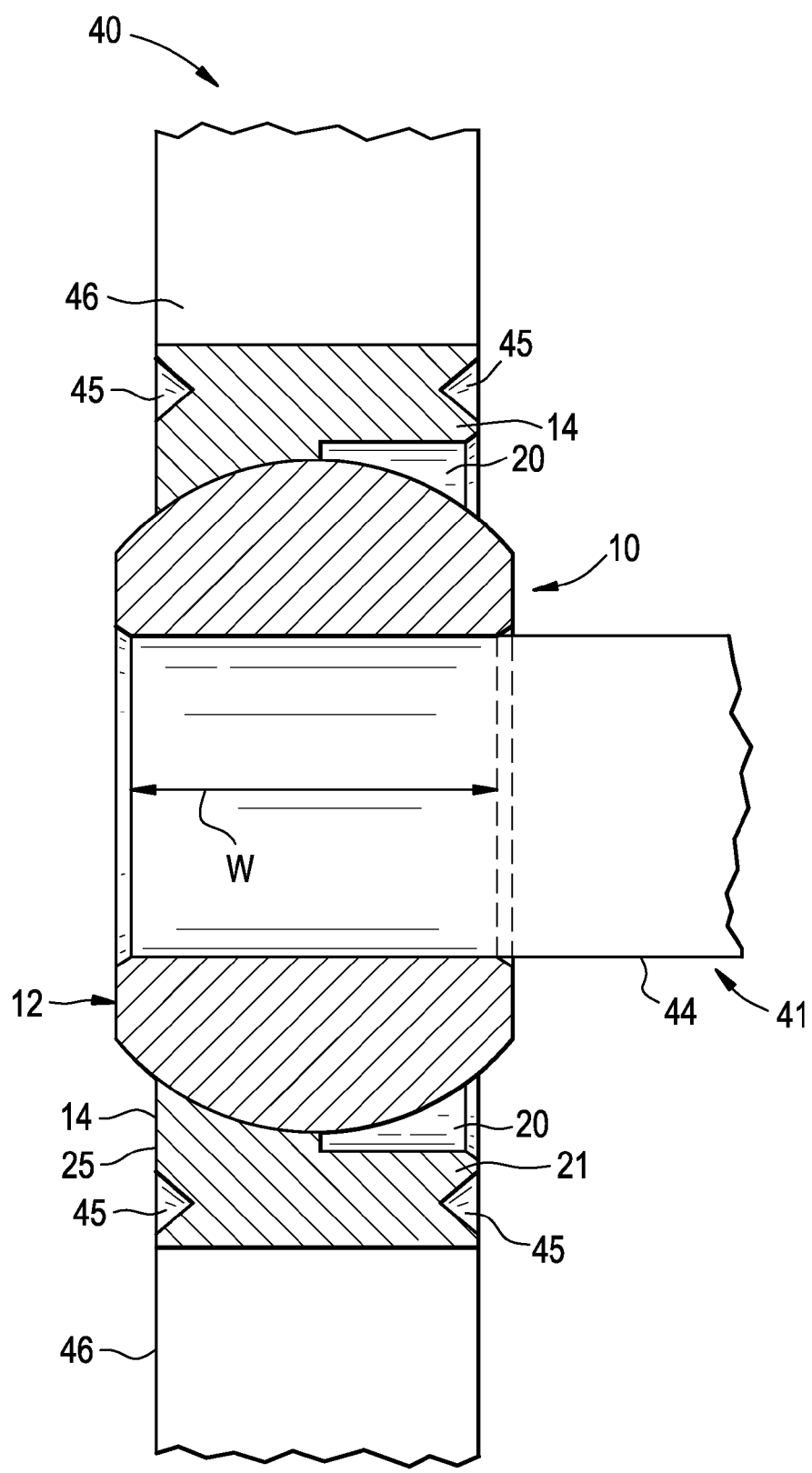
FIG. 4 is a partial cross-sectional view of a system employing a load slot bearing assembly of the present invention interconnected with two elements for relative movement therebetween.

As shown in FIG. 4, a load slot bearing system is designated by the reference number 40 and is hereinafter referred to as "system 40." System 40 may be defined by employing one or more bearing assemblies 10 to accommodate movement between moving elements such as, for example, a first element 41 located in the bore 16 of the ball 12 of the bearing assembly 10 and connected to the ball 10, and a second element 42 connected to the outer race 14 of the bearing assembly 10. The present invention is not so limited, as the movement between moving elements may include movement of at least one moving element relative to a stationary point, movement of a first moving element relative to a second moving element, or movement between or among more than two moving elements.

In one embodiment of the system 40, as shown in FIG. 4, the ball 12 is connected to a spherical bearing bolt 44. The present invention is not limited to the use of a spherical bearing bolt 44, however, as a shaft or pin or the like may be employed, or the ball 12 may be integrally formed with the spherical bearing bolt 44 or a shaft or pin or the like. The spherical bearing bolt 44 or the integrally formed ball 12 and spherical bearing bolt 44 may be case hardened by boron diffusion as described above with reference to the ball 12. In another embodiment of system 40, and the outer race 14 is connected to a housing, linkage, or the like, which is hereinafter designated by the reference number 46 and is referred to as "housing 46." Similarly, the outer race 14 may be integrally formed with the housing 46. The housing 46 or the integrally formed outer race 14 and housing 46 may be case hardened by boron diffusion as described above with reference to outer race 14. In the system 40 having both the spherical bearing bolt 44 and housing 46 as shown in FIG. 4, the bearing assembly 10 accommodates movement of the spherical bearing bolt 44 relative to the housing 46.

As described above with respect to the outer race 14, the housing 46 or the integrally formed outer race 14 and housing 46 must be fabricated from a high-temperature nickel alloy or a super alloy to advantageously be case hardened by boron diffusion. Fabricating the integrally formed outer race 14 and housing 46 from a high-temperature nickel alloy or a super alloy and case hardening the integrally formed outer race 14 and housing 46 by boron diffusion has been considered as not cost-beneficial and comparatively too costly relative to carburizing or nitriding such a link apparatus component. However, integrally fabricating the outer race 14 and the housing 46 from a high-temperature nickel alloy or a super alloy base material and case hardening the integrally formed outer race 14 and housing 46 by boron diffusion in accordance with the present invention provides a load slot bearing assembly, bearing assembly 10, and a load slot bearing system, system 40, particularly suitable for high-temperature applications and critical linkage applications such as mounting a gearbox to a geared turbofan engine.

Any suitable method of retaining the bearing assembly 10 in the housing 46 (as described below) can be employed, the method allowing for increased tolerances between the outer race 14 and the housing 46. In allowing for such increased tolerances, the housing 46 can be economically manufactured, thereby avoiding configurations employing integral housing-slot loader bearings or integral linkage-slot loader bearings available only from particular bearing manufacturers or highly skilled machine shops.

Figure 5:
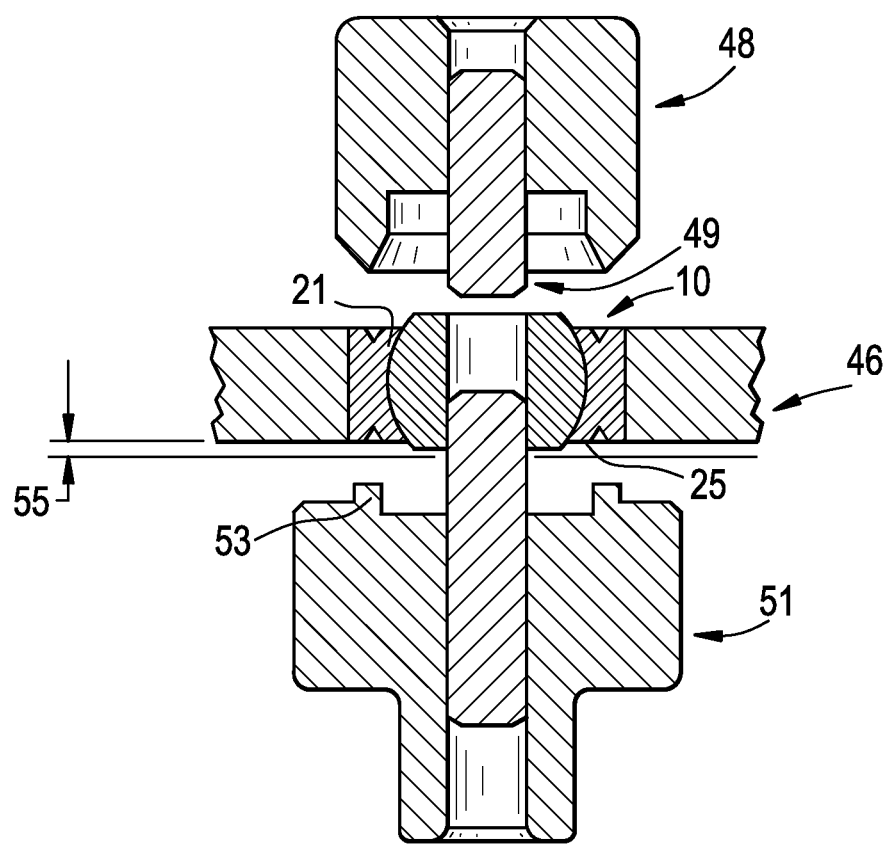
FIG. 5 is a partial cross-sectional view showing a method of assembling a load slot bearing assembly of the present invention.

As shown in FIGS. 4 and 5, one method of retaining the bearing assembly 10 in the housing 46 involves staking the bearing assembly into the housing. One method of staking the bearing assembly 10 in the housing 46 is v-groove staking. In v-groove staking, the bearing assembly 10 includes a v-groove 45 machined into the face 21 (and/or a face 25) of the outer race 14 of the bearing assembly 10, each v-groove 45 forming a small lip on the outside edges of the outer race. With the use of a staking tool, the lips are swaged over the edges of the housing 46 to retain the bearing assembly 10 in the housing. The present invention is not limited to the use of v-grooves, however, as other means of retaining the bearing assembly 10, such as for example threadedly mounting, bolting, and the like, are within the scope of the present invention. In any method of mounting the bearing assembly 10 into the housing 46, the bearing assembly 10 is removable from the system 40, thereby allowing maintenance, repair, or overhaul to involve replacement of the entire bearing assembly. Furthermore, because the precipitation-hardenable alloy of the outer race 14 is harder than the cobalt alloy of the ball 12, the ball is sacrificial relative to the outer race, which allows for replacement of only the ball in instances in which the outer race is not compromised. As shown in FIG. 5, the bearing assembly 10 is staked into the housing 46 using a staking tool 48 having a guide pin bearing 49 and a staking anvil 51. The staking anvil 51 includes a step 53 thereon to accommodate an offset 55 formed by the outer race 14 and a width of the housing 46.

Figure 6:
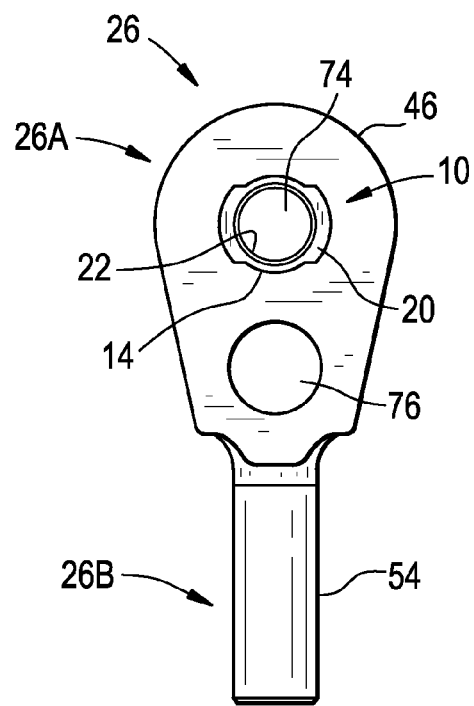
FIG. 6 is a front view of a housing incorporating a load slot bearing assembly of the present invention.

As shown in FIG. 6, a link apparatus 26 defines a first end comprising a head 26A and a second end comprising a stem 26B. In one embodiment, the head 26A defines the housing 46 and the bearing assembly 10 is received within the housing 46. The housing 46 includes a first opening 74 therethrough that defines the inner engagement surface 22 of the outer race 14. The inner engagement surface 22 of the outer race 14 in turn defines the two load slots 20. Accordingly, the outer race 14 is integral with the housing 46. The present invention is not limited in this regard, however, as the outer race 14 may be a distinct element that can be staked into the housing 46. As described above, the ball 12 is positioned in the outer race 14 and the spherical bearing bolt 44 (or similar element) is received therein. The housing 46 also includes a second opening 76, the secondary opening being configured to receive a mount failure bolt or the like. The stem 26B may define a threaded shaft 54 and such shaft 54 may be integrally formed with the housing 46. The link apparatus 26 may define, for example, an upper and/or lower rod end of a link assembly or a link apparatus.

Figure 7:
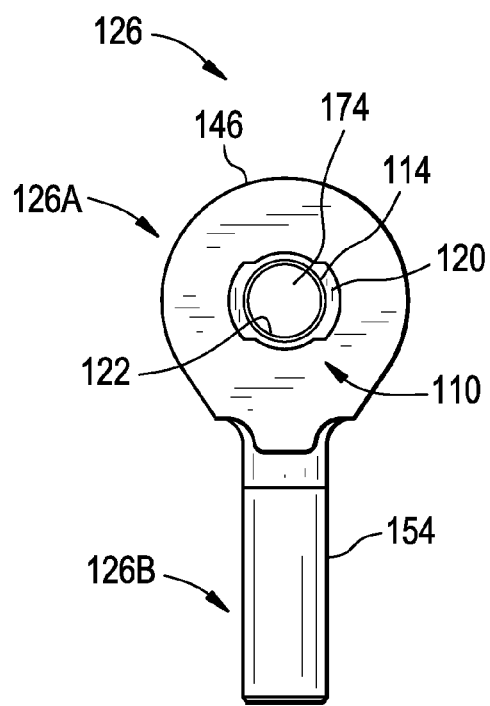
FIG. 7 is a front view of an alternate embodiment of a housing incorporating a load slot bearing assembly of the present invention.

Another embodiment of a link apparatus is depicted in FIG. 7 and is similar to the link apparatus 26 shown in FIG. 6, thus like elements are given a like element number preceded by the numeral 1.

As shown in FIG. 7, a link apparatus 126 defines a first end comprising a head 126A and a second end comprising a stem 126B. The head 126A defines a housing 146 and the bearing assembly 110 is received within the housing 146. The housing 146 includes a first opening 174 therethrough that defines an inner engagement surface 122 of an outer race 114. The inner engagement surface 122 of the outer race 114 in turn defines two load slots 120 wherein the outer race 114 is integral with the housing 146. The present invention is not limited in this regard, however, as the outer race 114 may be a distinct element that can be staked into the housing 146. In addition, a ball 112 is positioned in the outer race 114 and a spherical bearing bolt 144 (or similar element, not shown) is received therein. The stem 126B may define a threaded shaft 154 and such shaft 154 may be integrally formed with the housing 146. The link apparatus 126 also may define, for example, an upper and/or lower rod end of a link assembly or a link apparatus.

Figure 8:
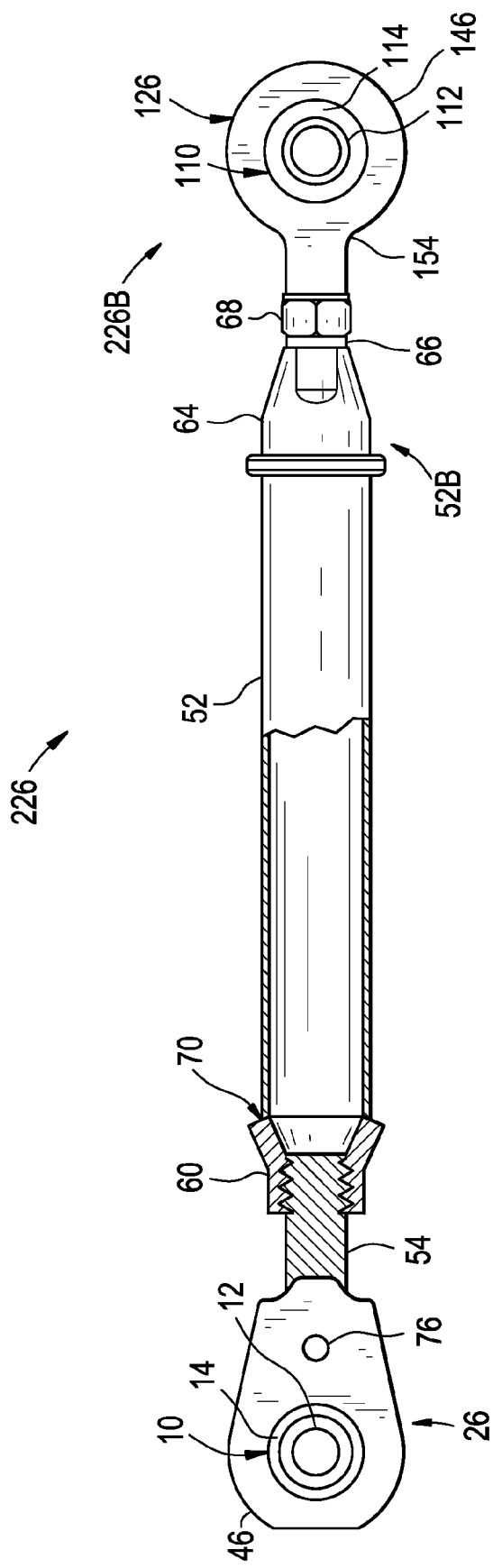
FIG. 8 is a side view of a link apparatus of the present invention.

As shown in FIG. 8, a link apparatus is designated by the reference number 226 and is hereinafter referred to as "apparatus 226." The apparatus 226 defines a first end 226A and a second end 226A. The link apparatus 26 shown in FIG. 6 is received within the first end 226A of the link apparatus 226; and the link apparatus 126 shown in FIG. 7 is received within the second end 226B of the link apparatus 226. The bearing assemblies 10 and 110 are located respectively in the housings 46 and 146. An elongated member such as a cylindrical member 52 extends between the housings 46 and 146. The link apparatus 26 is received within and engages a first end 52A of the cylindrical member 52; and the link apparatus 126 is received within and engages a second end 52B of the cylindrical member 52. The present invention is not so limited as the apparatus 226 may receive and engage: (i) the link apparatus 26 in each end 52A and 52B of the cylindrical member 52; (ii) the link apparatus 126 in each end 52A and 52B of the cylindrical member 52; or (iii) one only one of the link apparatuses 26 or 126 in only one end 52A or 52B of the cylindrical member 52. In addition, such engagement may be made by employing a threaded engagement (e.g., internal and external threads, a threaded extension and a nut, and the like), a press fit, and the like.

Still referring to FIG. 8, the shaft 54 is threadedly received within a first socket 60 positioned at the first end 52A of the cylindrical member 52 employing a left-handed thread. The shaft 154 is threadedly received within a second socket 64 positioned at the second end 52B of the cylindrical member 52 employing a right-handed thread. Once the shafts 54 and 154 are each threadedly received into the respective first socket 60 and second socket 64, locking devices 66 (e.g., lock washers) and nuts 68 may be used to secure the shafts to the sockets. Each of the first socket 60 and the second socket 64 is welded to the cylindrical member 52 at welds 70, which may extend circumferentially around a cross section of the cylindrical member 52. The present invention is not limited in this regard, as one or both of the first socket 60 and the second socket 64 may be integrally formed with the cylindrical member 52, or they may be swaged onto the cylindrical member.

In the embodiment illustrated in FIG. 8, each bearing assembly 10 and 110 is staked respectively into the housings 46 and 47. Such a configuration renders each bearing assembly, or portions of each bearing assembly, replaceable as desired depending upon the conditions warranting maintenance, repair, or overhaul. The present invention is not limited in this regard, however, as the outer race 14 and 114 of the respective bearing assemblies 10 and 110 may be integral with each of the respective stems 54 and 154. In any embodiment, the balls 12 and 112 of respective bearing assemblies 10 and 110 is attachable to any desired mechanism between which the link apparatus 226 is providing mechanical communication, such as the spherical bearing bolt (not shown).

As described above, the link apparatus 226 comprising one or more load slot bearing assemblies of the present invention may be employed for mounting a gearbox to a geared turbofan engine, preferably at a front end thereof. The link apparatus 226 also may be employed for an actuating system for a turbofan engine component of a geared turbofan engine, particularly a turbofan engine component having a variable geometry system, such as, for example, a variable stator vane ("VSV") assembly, a variable bypass valve ("VBV") assembly, or a variable exhaust nozzle. Moreover, the link apparatus 226 may be employed in conjunction with rod ends, bell cranks, linkages, and the like in other systems including, but not limited to, crankshaft systems and systems for the control of bleed, cooling and/or bypass air.

Figure 9:
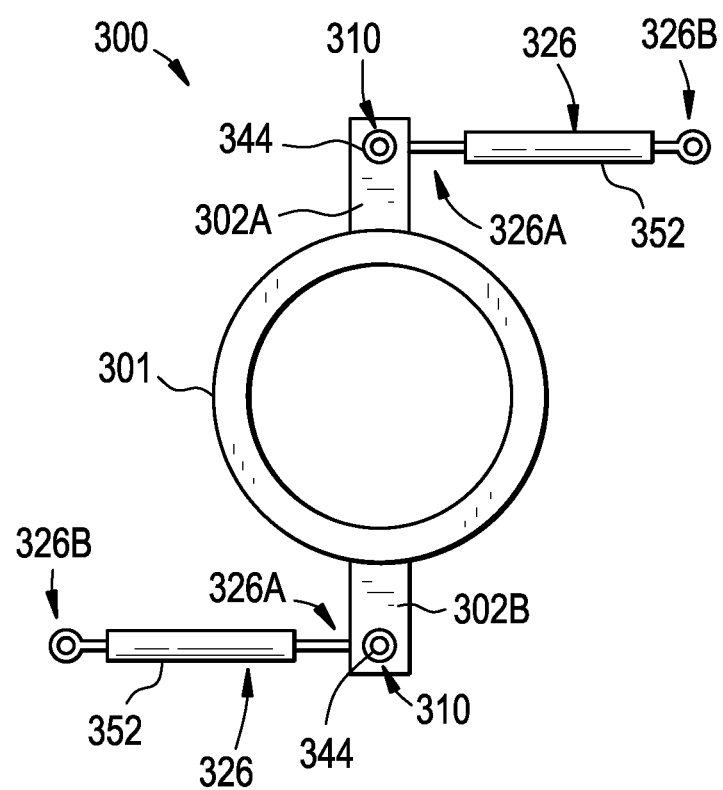
FIG. 9 is a top plan view of a turbofan engine variable stator vane actuator ring assembly which is engaged by two of the link apparatuses of FIG. 8.

As shown in FIG. 9, a VSV actuator system is shown generally at 300 and is hereinafter referred to as "system 300." The VSV actuator system provides for the adjustment of a set of stator vanes internal to the turbofan engine to obtain a smoother air flow through a compressor section of the geared turbofan engine. System 300 comprises an actuator ring 301 defining one or more flanges 302, flanges 302A and 302B. A link apparatus 326 includes a bearing a bearing assembly 310 that is pivotally connected at a first end 326A to each flange 302A and 302B via a spherical bearing bolt 344 or the like. Each of the link apparatuses 326 is pivotally connected at a second end 326B to a structural member (not shown) of the turbofan engine via another spherical bearing bolt (not shown) or the like. In system 300, the link apparatuses 326 comprise an actuator such as, for example, a pneumatic cylindrical member 352. Upon operation of the cylindrical member 352, the flange 302 and/or the actuator ring 301 is moved to adjust the stator vanes (not shown) in the turbofan engine. The bearing assemblies 310 allow for the desired operation of the system 300 at the temperatures encountered in the turbofan engine.

Figure 10:
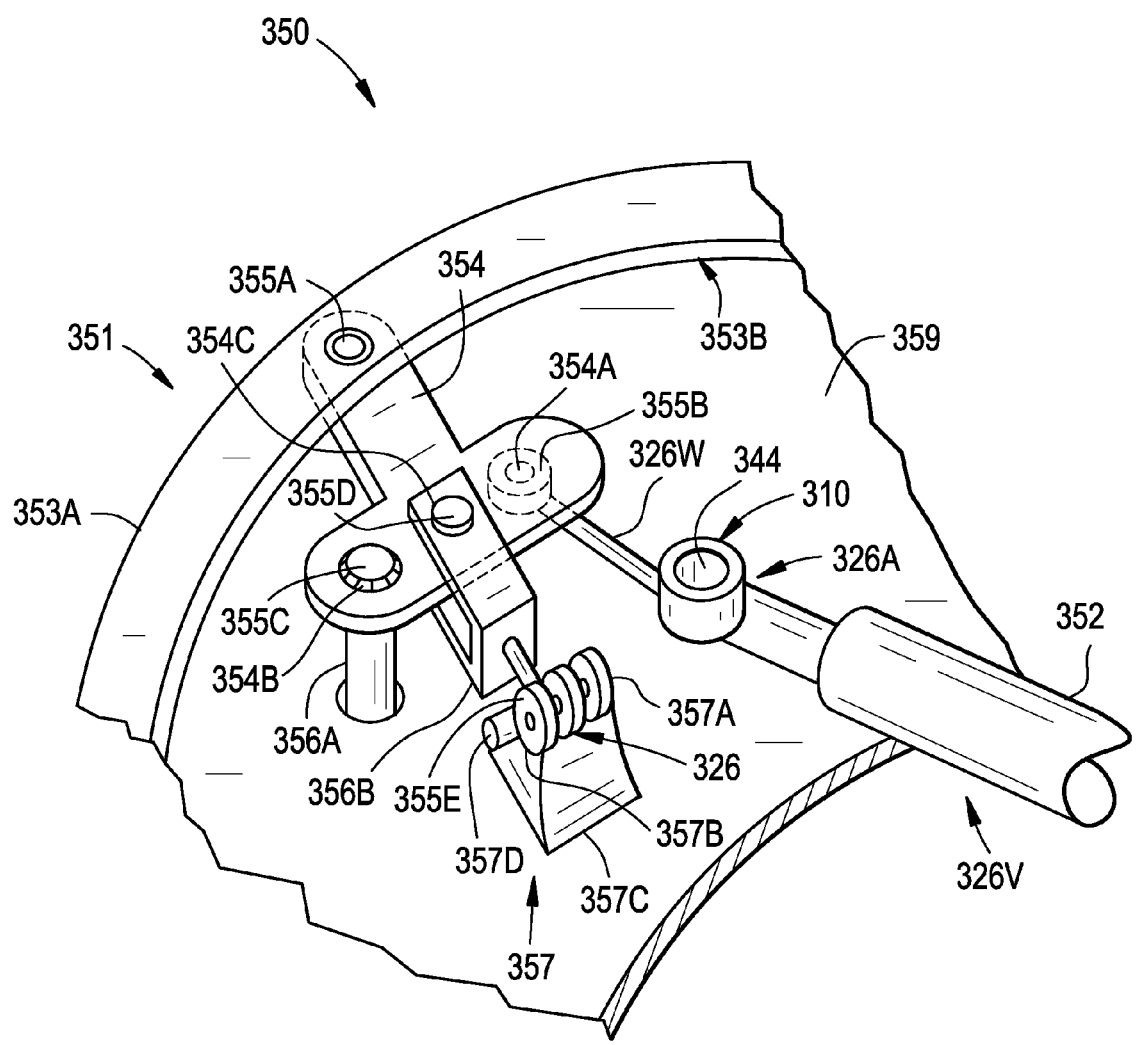
FIG. 10 is a perspective view of a turbofan engine variable bypass valve assembly which is engaged by the link apparatus of FIG. 8.

As shown in FIG. 10, a VBV assembly is shown generally at 350 and is hereinafter referred to as "system 350." Along with the VSV actuator system, system 300, the VBV assembly, system 350, is employed to obtain a smoother air flow through the compressor section of the geared turbofan engine by allowing a specified amount of air to bypass a stator vane assembly or stage. System 350 further comprises a ring such as the actuator ring 301 (FIG. 9), a disc or ring 351, or a like component of a stator vane assembly or stage. The ring 351 defines a base 359 that typically extends radially outward from a shaft (not shown) or other turbofan engine component that extends axially along a centerline of the turbofan engine. The ring 351 further defines a flange 353A along its radially inner facing periphery that defines an axially extending channel 353B. A first VBV linkage or T-bracket 354 is positioned within the channel 353B and is pivotally connected thereto via a fastener such as a pin 355A.

In system 350, a first link apparatus 326V comprises an actuator such as, for example, a pneumatic cylindrical member 352. The first link apparatus 326V includes a bearing assembly 310 at a first end 326A having a spherical bearing bolt 344 installed therein. The first link apparatus 326V is pivotally connected to a second VBV linkage or a second link apparatus 326W, at a first end, via another spherical bearing bolt. The first link apparatus 326V is pivotally connected at a second or distal end to a structural member (not shown) of the turbofan engine via another spherical bearing bolt or the like. The link apparatus 326W, at a second end, is pivotally connected to a first aperture 354A defined in the T-bracket 354 via a fastener such as a pin 355B. A mount or shaft 356A extending upwardly from, or axially outward from, the base 359 of the ring 351 is pivotally connected to a second aperture 354B defined in the T-bracket 354 via a fastener such as a pin 355C. A third VBV linkage or a clevis link 356B is pivotally connected to a third aperture 354D defined in the T-bracket 354 via a fastener such as a pin 355D. While the fasteners employed with the system 350 are shown and described as a pins 355A, 355B, 355C and 355D, the present invention is not limited in this regard as one or more of the fasteners may define a bearing assembly 10, other bearing assemblies such as spherical plain bearings and roller or needle bearings, or other pivotally mounted fasteners, without departing from the broader aspects of the invention.

A link apparatus 326X extends outwardly from the clevis link 356B and is pivotally connected to one or more rotatable socket-type joints 357A and 357B via a bearing assembly 310 and a spherical bearing bolt or a shaft or pin 355E extending therethrough. Such socket-type joints 357A and 357B each may comprise a bearing assembly 310 installed therein. A VBV door assembly 357 defines a door flap 357C rotatably connected on one side to the base 359 of the ring 351 via a hinged connection 357D. Upon operation of the cylindrical member 352, the T-bracket 354 rotates about pin 355A connecting the T-bracket 354 to the flange 353A, and in turn the link apparatus 326X extending from the clevis link 356B acts upon the VBV door assembly 357 such that it rotates upwardly, or axially outwardly, from the base 359 thereby exposing an opening or cavity in the base 359 through which bypass air will flow. The VBV assembly allows for the desired operation of the VBV door assembly 357 at the temperatures encountered in the turbofan engine by defining one of a partially open air flow condition and a closed air flow condition.

Figure 11:
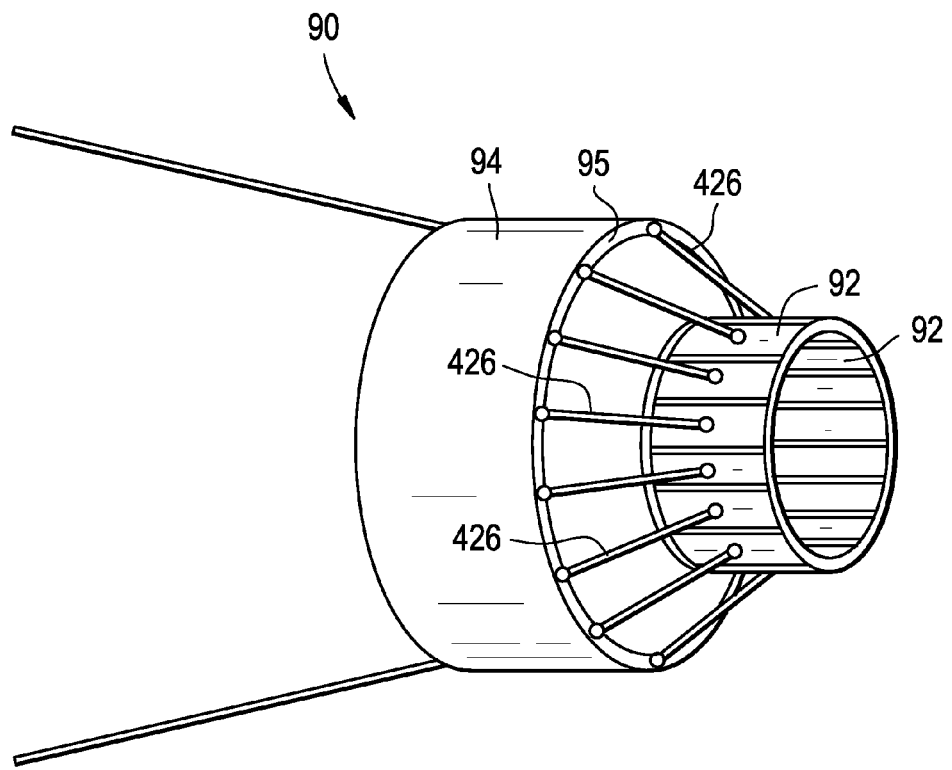
FIG. 11 is a perspective view of a variable exhaust nozzle of a turbofan engine, the variable exhaust nozzle comprising a plurality of the link apparatuses of FIG. 8.
Figure 12:
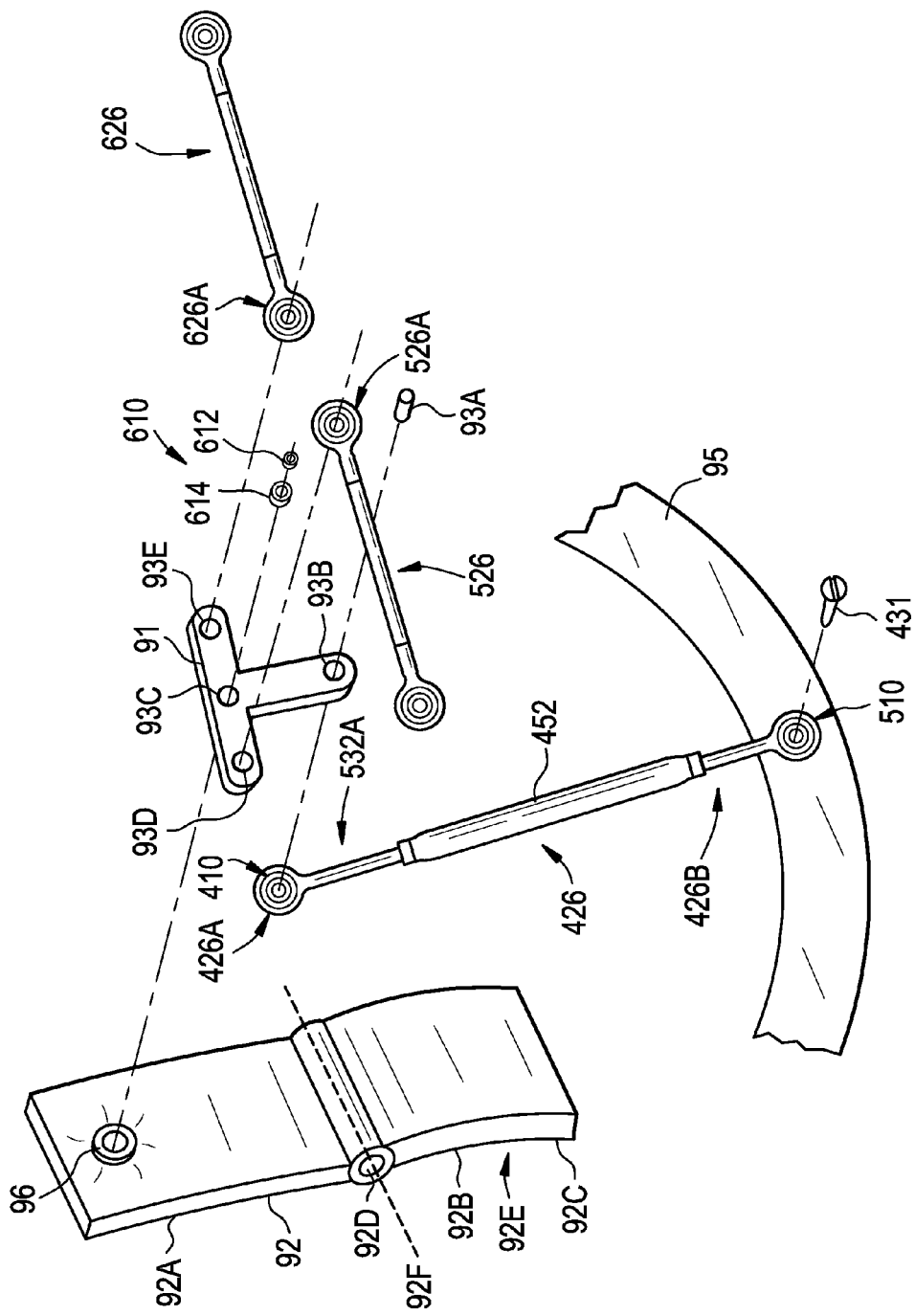
FIG. 12 is an exploded perspective view of a plate and the plurality of link apparatuses of the variable exhaust nozzle of FIG. 11.

As shown in FIG. 11, an afterburner or augmentor of a turbofan engine includes a variable exhaust nozzle 90. The variable exhaust nozzle 90 is particularly useful on a low-bypass turbofan engine, and is used to increase thrust for short periods of time during takeoff, climb, and flight. The variable exhaust nozzle 90 comprises a case or housing 94 and a plurality of independent panels or plates 92 that are pivotally connected to, or mounted on, an aft flange 95 of the housing 94 by at least one link apparatus 426. As shown in FIG. 12, one embodiment of the plate 92 comprises a first section 92A, a second section 92B pivotally connected to the first section 92A via a hinge section 92D such that the first and second sections 92A and 92B may rotate about an axis 92 F when the plate 92 is actuated by one or more of the link apparatuses 426. In addition, the second section 92B may define a flared section 92C at an aft end 92E of the plate 92.

Each of the link apparatuses 426, or connecting rods, defines a first end 426A and a second end 426B, and comprises an actuator such as, for example, a pneumatic cylindrical member 452. The link apparatus 426 includes a bearing assembly 410 located at the first end 426A. The link apparatus 426 is pivotally connected to the plate 92 via a T-bracket 91, or like bracket. A shaft or pin 93A extends through the bearing assembly 410 of the link apparatus 426 and is received within an aperture 93B formed in the T-bracket 91. The present invention is not so limited as the link apparatus 426 and the bearing assembly 410 can be pivotally connected directly to a receiving mounting 96 extending outwardly from the plate 92. The second end 426B of the link apparatus 426 is removeably and securely fastened to the aft flange 95 of the housing 94 of the variable exhaust nozzle 90, via a bearing 510 or a fastener 431 such as a shaft or pin or the like. The present invention is not so limited as the second end 426B of the link apparatus 426 can be pivotally connected to a linkage assembly (not shown) that is, in turn, removeably and securely fastened to another structural member.

In one embodiment, the T-bracket 91 is pivotally connected to the receiving mounting 96 extending outwardly from the plate 92 via a bearing assembly 610 received within an aperture 93C formed in the T-bracket 91 and the receiving mounting 96. One or more additional link apparatuses, such as for example link apparatuses 526 and 626, may be employed to impart rotational movement to the T-bracket 91 about the bearing assembly 610 received within the receiving mounting 96 of the plate 92 and in relation to a structural member (not shown). In one embodiment, a first end 526A of the link apparatus 526 is pivotally connected to an aperture 93D formed in the T-bracket 91 via a bearing assembly (not shown). In another embodiment, a first end 626A of the link apparatus 626 is pivotally connected to an aperture 93E formed in the T-bracket 91 via a bearing assembly (not shown).

Referring to FIGS. 11 and 12, the aft ends 92E of the plates 92 can be made to diverge and converge upon the movement of the link apparatuses 426, 526 and 626 operably coupled to each plate 92 and to the variable exhaust nozzle 90. Movement of each of the link apparatuses 426, 526 and 626 is effected via the T-bracket 91 rotatably mounted on the plate 92. The link apparatuses 426, 526 and 626 are coupled to the T-bracket 91 and are operably connected to one or more actuators, or the link apparatuses 426, 526 and 626 comprise the actuators. Moving the link apparatus 426 via the actuators 526 and 626 causes rotation of the T-bracket 91, which in turn causes the link apparatus 426 to rotate about the point at which it is coupled to the variable exhaust nozzle 90, thereby causing the aft ends 92E of the plates 92 to diverge or converge.

One embodiment of the present invention provides a load slot bearing system for a mounting system for a gearbox on a geared turbofan engine wherein the load slot bearing system comprises a load slot bearing assembly. The load slot bearing assembly comprises an inner member comprising a cobalt alloy and the inner member has a spherical outer diameter and a bore extending at least partway therethrough such that the spherical outer diameter defines an outer engagement surface. The load slot bearing assembly further comprises an outer member comprising a precipitation-hardenable alloy and the outer member has a spherical inner diameter defining an inner engagement surface that is positioned on the outer engagement surface of the inner member and contoured to a shape complementary to the outer engagement surface of the inner member such that the outer engagement surface of the inner member is slidably and rotatably engaged with the inner engagement surface of the outer member. At least one of the outer engagement surface of the inner member or the inner engagement surface of the outer member has boron diffused therein. The load slot bearing system further comprises a first slot extending inward from a face defined by the outer member and a second slot extending inward from the face defined by the outer member, the second slot being positioned generally diametrically opposite the first slot. A first element is located in the bore of the inner member of the load slot bearing assembly and is connected to the inner member, and a second element is connected to the outer member of the load slot bearing assembly.

The inner member of the load slot bearing assembly comprises a ball and the outer member of the load slot bearing assembly comprises an outer race. The outer race precipitation-hardenable alloy comprises stainless steel, a nickel alloy or a super alloy wherein the super alloy may be Inconel® brand austenitic nickel-chromium-based super alloys, Waspaloy® brand age hardening austenitic (face-centered cubic) nickel-based superalloy, René® 41 brand nickel-based high temperature alloys, and Hastelloy® brand corrosion resistant alloy. The inner engagement surface of the outer race is case hardened by boron diffusion and may comprise a wear-resistant plating.

At least a portion of the ball may be case hardened by boron diffusion and the ball may comprise an anti-galling compound on the outer surface of the ball. The first element located in the bore of the ball may comprise a spherical bearing bolt; and the ball and the spherical bearing bolt may be integrally formed. The integrally formed ball and spherical bearing bolt may be case hardened by boron diffusion. The second element connected to the outer race may comprise a housing; and the outer race and the housing may be integrally formed. The integrally formed outer race and housing may be case hardened by boron diffusion.

In another embodiment, the present invention provides a link apparatus for an actuating system for a turbofan engine component of a geared turbofan engine. The link apparatus comprises an elongated member defining a first end and a second end that includes a first housing located at the first end of the elongated member and a second housing located at the second end of the elongated member. A first load slot bearing assembly is located in the first housing and a second load slot bearing assembly is located in the second housing. The first and second load slot bearing assemblies each comprise a ball comprising a cobalt alloy and having a spherical outer diameter and a bore extending at least partway therethrough, the spherical outer diameter defining an outer engagement surface. The first and second load slot bearing assemblies each further comprise an outer race comprising a precipitation-hardenable alloy and having a spherical inner diameter defining an inner engagement surface case hardened by boron diffusion and positioned on the outer engagement surface of the ball and contoured to a shape complementary to the outer engagement surface of the ball such that the outer engagement surface of the ball is slidably and rotatably engaged with the inner engagement surface of the outer race. The first and second load slot bearing assemblies also define a first slot extending inward from a face defined by the outer race and a second slot extending inward from the face defined by the outer race, the second slot being positioned generally diametrically opposite the first slot.

The actuating system for the turbofan engine component of the geared turbofan engine may actuate a variable stator vane assembly, a variable by-pass valve, or a variable exhaust nozzle.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A load slot bearing system for a mounting system for a gearbox on a geared turbofan engine, the load slot bearing assembly comprising:
    an inner member comprising a cobalt alloy and having a spherical outer diameter and a bore extending at least partway therethrough, the spherical outer diameter defining an outer engagement surface;
    an outer member comprising a precipitation-hardened nickel-based super alloy and having a spherical inner diameter defining an inner engagement surface and positioned on the outer engagement surface of the inner member and contoured to a shape complementary to the outer engagement surface of the inner member such that the outer engagement surface of the inner member is slidably and rotatably engaged with the inner engagement surface of the outer member;
    wherein the inner engagement surface of the outer member has boron diffused therein to create a case depth, the case depth including intermetallic borides, the intermetallic borides configuring the inner engagement surface to maintain a predetermined hardness up to about 315.6° C. (600° F.);
    a first slot extending axially inward from an axial face defined by the outer member;

a second slot extending axially inward from the axial face defined by the outer member, the second slot being positioned generally diametrically opposite the first slot;

a first element located in the bore of the inner member of the load slot bearing assembly and connected to the inner member; and a second element connected to the outer member of the load slot bearing assembly.

2. The load slot bearing system of claim 1, wherein the inner member of the load slot bearing assembly comprises a ball and the outer member of the load slot bearing assembly comprises an outer race.

3. The load slot bearing system of claim 1, wherein the precipitation hardened nickel-based super alloy comprises stainless steel.

4. The load slot bearing system of claim 2, wherein the inner engagement surface of the outer race further comprises a wear-resistant plating.

5. The load slot bearing system of claim 2, wherein the ball further comprises an anti-galling compound on the outer surface of the ball.

6. The load slot bearing system of claim 2, wherein the second element connected to the outer race comprises a housing.

7. The load slot bearing system of claim 1, wherein the case depth is 0.00508 mm (0.0002 inch) to 0.0127 mm (0.0005 inch).

8. The load slot bearing system of claim 1, wherein the precipitation-hardened nickel-based super alloy is selected from the group consisting of an austenitic nickel-chromium-based super alloy, an age hardening austenitic nickel-based superalloy, a corrosion resistant alloy, and a nickel-based high temperature alloy.

9. A link apparatus for an actuating system for a turbofan engine component of a geared turbofan engine, the link apparatus comprising:

an elongated member defining a first end and a second end;

a first housing located at the first end of the elongated member;

a second housing located at the second end of the elongated member;

a first load slot bearing assembly located in the first housing; and a second load slot bearing assembly located in the second housing;

the first load slot bearing assembly and the second load slot bearing assembly each comprising, a ball comprising a cobalt alloy and having a spherical outer diameter and a bore extending at least partway therethrough, the spherical outer diameter defining an outer engagement surface;

an outer race comprising a precipitation-hardened nickel-based super alloy and having a spherical inner diameter defining an inner engagement surface case hardened by boron diffusion to create a case depth, the case depth including intermetallic borides, the intermetallic borides configuring the inner engagement surface to maintain a predetermined hardness up to about 315.6° C. (600° F.) and the outer race being positioned on the outer engagement surface of the ball and contoured to a shape complementary to the outer engagement surface of the ball such that the outer engagement surface of the ball is slidably and rotatably engaged with the inner engagement surface of the outer race;

a first slot extending axially inward from an axial face defined by the outer race; and a second slot extending axially inward from the axial face defined by the outer race, the second slot being positioned generally diametrically opposite the first slot.

10. The link apparatus of claim 9, wherein the case depth is 0.00508 mm (0.0002 inch) to 0.0127 mm (0.0005 inch).

\* \* \* \* \*